United States Patent
Trim et al.

(10) Patent No.: US 11,165,605 B2
(45) Date of Patent: Nov. 2, 2021

(54) PERSONALIZED PRIVATE ROAMING SERVICE SET IDENTIFIERS

(71) Applicant: International Business Machines Corporation, Armonk, NY (US)

(72) Inventors: Craig M. Trim, Ventura, CA (US); Seng Chai Gan, Ashburn, VA (US); Shikhar Kwatra, Durham, NC (US); Adam Lee Griffin, Dubuque, IA (US); Michael Nicholas Virnoche, Flowery Branch, GA (US)

(73) Assignee: International Business Machines Corporation, Armonk, NY (US)

( * ) Notice: Subject to any disclaimer, the term of this patent is extended or adjusted under 35 U.S.C. 154(b) by 23 days.

(21) Appl. No.: 16/812,410

(22) Filed: Mar. 9, 2020

(65) Prior Publication Data
US 2021/0281445 A1   Sep. 9, 2021

(51) Int. Cl.
*H04L 12/46* (2006.01)
*H04L 12/24* (2006.01)
*H04W 84/12* (2009.01)

(52) U.S. Cl.
CPC ...... *H04L 12/4641* (2013.01); *H04L 41/5041* (2013.01); *H04W 84/12* (2013.01)

(58) Field of Classification Search
None
See application file for complete search history.

(56) References Cited

U.S. PATENT DOCUMENTS

| 7,289,805 | B2  | 10/2007 | Tom |
| 7,373,661 | B2* | 5/2008  | Smith ............... H04L 63/0272 709/229 |
| 7,398,087 | B1  | 7/2008  | McConnell |
| 8,655,993 | B1* | 2/2014  | Mixter ............... H04L 63/126 709/221 |
| 9,049,042 | B2  | 6/2015  | Tagg |

(Continued)

FOREIGN PATENT DOCUMENTS

| EP | 2134127 B1  | 5/2012 |
| EP | 3131238 B1  | 1/2018 |
| WO | 2005041612 A1 | 5/2005 |

OTHER PUBLICATIONS

"Accelerate cloud transformation with cloud identity and access", IBM, Printed Dec. 19, 2019, 11 pages, <https://www.ibm.com/security/identity-access-management/cloud-identity>.

(Continued)

*Primary Examiner* — Kenny S Lin
(74) *Attorney, Agent, or Firm* — Randy E. Tejeda (57) ABSTRACT

In an approach to generating and managing personalized private roaming service set identifiers and networks, one or more computer processors generate one or more private networks based on one or more policies associated with a user and capabilities of one or more network providers in a communication proximity to the user. The one or more computer processors create one or more configuration files required to implement the one or more generated private networks on the one or more network providers. The one or more computer processors implement the one or more generated private networks by applying the one or more created configuration files to the one or more network providers.

20 Claims, 3 Drawing Sheets

(56) References Cited

U.S. PATENT DOCUMENTS

| | | | |
|---|---|---|---|
| 9,781,743 B2 | 10/2017 | Van Loon | |
| 2003/0233580 A1 | 12/2003 | Keeler | |
| 2006/0223528 A1 | 10/2006 | Smith | |
| 2007/0021113 A1 | 1/2007 | Hamasaki | |
| 2010/0202320 A1* | 8/2010 | Bennett | H04W 84/18 370/254 |
| 2010/0281251 A1* | 11/2010 | Arauz Rosado | H04L 63/0272 713/152 |
| 2013/0031271 A1* | 1/2013 | Bosch | H04W 40/246 709/245 |
| 2014/0075567 A1 | 3/2014 | Raleigh | |
| 2015/0263865 A1* | 9/2015 | Rangarajan | H04L 63/20 370/254 |
| 2015/0263867 A1* | 9/2015 | Chen | H04L 12/4641 370/401 |
| 2016/0142911 A1* | 5/2016 | Kreiner | H04W 48/18 370/328 |
| 2018/0249316 A1 | 8/2018 | Moore | |
| 2020/0037237 A1* | 1/2020 | Becha | H04W 4/021 |

OTHER PUBLICATIONS

"Identity and access management (IAM)", IBM, Printed Dec. 19, 2019, 5 pages, <https://www.ibm.com/security/identity-access-management>.

"Identity and Access Management Services", IBM, Printed Dec. 19, 2019, 7 pages, <https://www.ibm.com/security/services/identity-access-management>.

"RADIUS", Wikipedia, This page was last edited on Nov. 8, 2019, 19 pages, <https://en.wikipedia.org/wiki/RADIUS>.

Kwatra et al., "Personal-Public Service Set Identifiers", U.S. Appl. No. 16/508,375, filed Jul. 11, 2019, 60 pages.

* cited by examiner

PERSONALIZED PRIVATE ROAMING SERVICE SET IDENTIFIERS

BACKGROUND

The present invention relates generally to the field of wireless communication, and more particularly to generating and managing personalized private roaming service set identifiers and networks.

A wireless network is a computer network that uses wireless data connections between network nodes. Wireless networking is a method by which homes, telecommunications networks and business installations avoid the costly process of introducing cables into a building, or as a connection between various equipment locations. Admin telecommunications networks are generally implemented and administered using radio communication. This implementation takes place at the physical level (layer) of the Open Systems Interconnection (OSI) model network structure. Examples of wireless networks include cell phone networks, wireless local area networks (WLANs), wireless sensor networks, satellite communication networks, and terrestrial microwave networks.

In Institute of Electrical and Electronics Engineers (IEEE) 802.11 wireless local area networking standards, a service set (also known as extended service set or ESS) is a group of wireless network devices which are identified by the same SSID (service set identifier). SSIDs serve as network names and are typically natural language labels. A service set forms a logical network operating with the same level 2 networking parameters on the same logical network segment (e.g., IP subnet or VLAN).

SUMMARY

Embodiments of the present invention disclose a computer-implemented method, a computer program product, and a system for generating and managing personalized private roaming service set identifiers and networks. The computer-implemented method includes one or more computer processors generating one or more private networks based on one or more policies associated with a user and capabilities of one or more network providers in a communication proximity to the user. The one or more computer processors create one or more configuration files required to implement the one or more generated private networks on the one or more network providers. The one or more computer processors implement the one or more generated private networks by applying the one or more created configuration files to the one or more network providers.

DETAILED DESCRIPTION

In traditional roaming scenarios, users are forced to utilize public networks in everyday operations. Current public wireless networks force all users to share one open (e.g., unencrypted) wireless SSID and associated network providing extended opportunities for malicious actors and activities. Public wireless networks are typically unencrypted networks provided indiscriminately to a plurality of geographically restricted users. Public wireless networks allow for increased incidents of snooping, sniffing, and man-in-the-middle attacks, primarily due to the unencrypted aspects of the public wireless networks. Unauthorized access to a SSID jeopardizes security for other devices connected to the SSID. For example, a malicious user with unauthorized access to the SSID can intercept network traffic from other users. Intercepted network traffic can include sensitive, private, personal, or otherwise confidential information which may be used by a malicious actor for fraudulent purposes.

Embodiments of the present invention allow for increased SSID portability and personalization through the generation of private SSIDs and associated wireless networks. Embodiments of the present invention allow for the selection of specific private SSIDs and associated SSID generation/activation based on a combination of wireless network capabilities and user permissions. Embodiments of the present invention provide user and realm specific SSID policy-controlled networks in a roaming environment. Embodiments of the present invention provide migrating quality-of-service control to roaming or traveling private SSID networks. Embodiments of the present invention prioritize access and utilization of one or more generated private networks. Embodiments of the present invention allow for public wireless users to, automatically, acquire personal, unadvertised, and private SSIDs, promoting exclusive utilization for one or more user devices. Embodiments of the present invention recognize that system and information security is enhanced in a public/roaming environment through the generation of private personalized wireless networks. Embodiments of the present invention recognize that network security and computational efficiency is increased by terminating under-utilized and temporally limited networks. Implementation of embodiments of the invention may take a variety of forms, and exemplary implementation details are discussed subsequently with reference to the Figures.

The present invention will now be described in detail with reference to the Figures.

Figure 1:
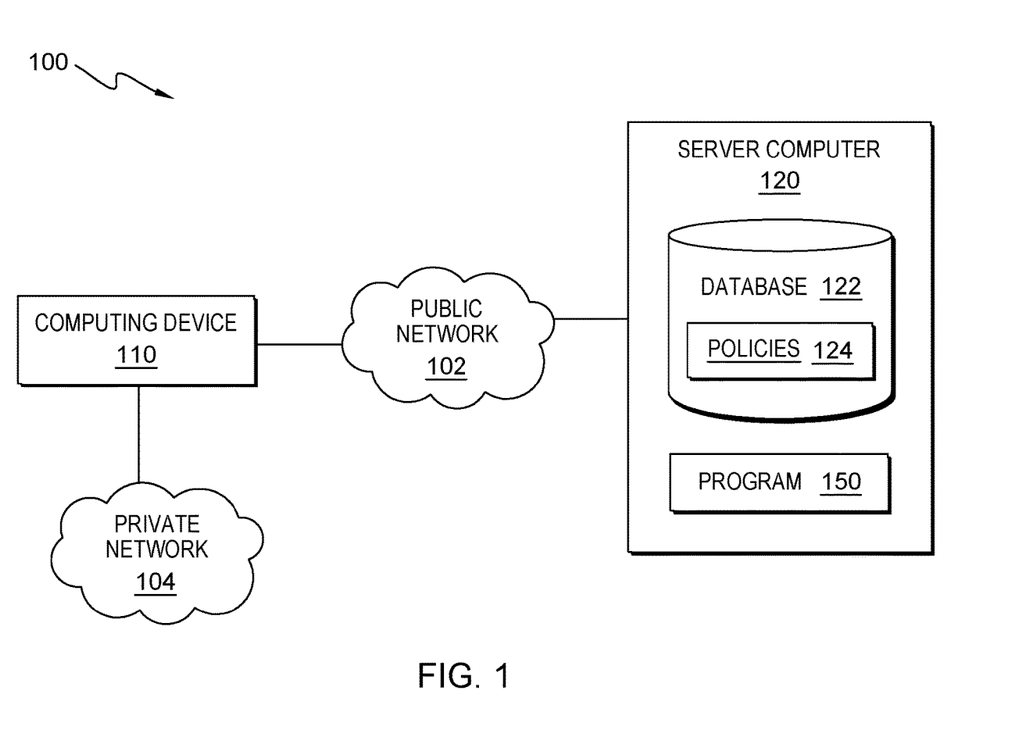
FIG. 1 is a functional block diagram illustrating a distributed data processing environment, in accordance with an embodiment of the present invention.

FIG. 1 is a functional block diagram illustrating a distributed data processing environment, generally designated 100, in accordance with one embodiment of the present invention. The term "distributed" as used in this specification describes a computer system that includes multiple, physically, distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes computing device 110 and server computer 120, interconnected over public network 102 and private network 104. Public network 102 and private network 104 can be each, for example, a telecommunications network, a local area network (LAN), a wide area network (WAN), such as the Internet, or a combination of the three, and can include wired, wireless, or fiber optic connections. Public network 102 and private network 104 can each include one or more wired and/or wireless networks that are capable of receiving and transmitting data, voice, and/or video signals, including multimedia signals that include voice, data, and video information. In general, public network 102 and private network 104 can be any combination of connections and protocols that will support communications between computing device 110, server computer 120, and other computing devices (not shown) within distributed data processing environment 100. In various embodiments, public network 102 and private network 104 each operate locally via wired, wireless, or optical connections and can be any combination of connections and protocols (e.g., personal area network (PAN), near field communication (NFC), laser, infrared, ultrasonic, etc.). In an embodiment, public network 102 and private networks 104 are accessibility distinguishable. For example, private network 104 will only allow connections from an authenticated and authorized user.

Computing device 110 may be any electronic device or computing system capable of processing program instructions and receiving and sending data. In some embodiments, computing device 110 may be a laptop computer, a tablet computer, a netbook computer, a personal computer (PC), a desktop computer, a personal digital assistant (PDA), a smart phone, or any programmable electronic device capable of communicating with public network 102 and private network 104. In other embodiments, computing device 110 may represent a server computing system utilizing multiple computers as a server system, such as in a cloud computing environment. In an embodiment, computing device 110 contains a client version of program 150. In general, computing device 110 is representative of any electronic device or combination of electronic devices capable of executing machine readable program instructions as described in greater detail with regard to FIG. 3, in accordance with embodiments of the present invention.

Server computer 120 can be a standalone computing device, a management server, a web server, a mobile computing device, or any other electronic device or computing system capable of receiving, sending, and processing data. In other embodiments, server computer 120 can represent a server computing system utilizing multiple computers as a server system, such as in a cloud computing environment. In another embodiment, server computer 120 can be a laptop computer, a tablet computer, a netbook computer, a personal computer (PC), a desktop computer, a personal digital assistant (PDA), a smart phone, or any programmable electronic device capable of communicating with computing device 110 and other computing devices (not shown) within distributed data processing environment 100 via network 102. In another embodiment, server computer 120 represents a computing system utilizing clustered computers and components (e.g., database server computers, application server computers, etc.) that act as a single pool of seamless resources when accessed within distributed data processing environment 100. In the depicted embodiment, server computer 120 includes database 122 and program 150. In other embodiments, server computer 120 may contain other applications, databases, programs, etc. which have not been depicted in distributed data processing environment 100. In an embodiment, server computer 120 contains an authentication module or service. In an example, server computer 120 contains a remote authentication dial-in user service (RADIUS) providing centralized authentication, authorization, and accounting (AAA) management. In this example, program 150 utilizes the RADIUS as a client/server protocol running in an application layer utilizing either transmission control protocol (TCP) or user datagram protocol (UDP) as transport. Server computer 120 may include internal and external hardware components, as depicted, and described in further detail with respect to FIG. 3.

Database 122 is a repository for data used by program 150. In the depicted embodiment, database 122 resides on server computer 120. In another embodiment, database 122 may reside on computing device 110 or elsewhere within distributed data processing environment 100 provided program 150 has access to database 122. A database is an organized collection of data. Database 122 can be implemented with any type of storage device capable of storing data and configuration files that can be accessed and utilized by program 150, such as a database server, a hard disk drive, or a flash memory. In an embodiment, database 122 stores data used by program 150, such as user permissions, usage logs, and historically generated SSIDs. In the depicted embodiment, database 122 contains policies 124.

Policies 124 contains one or more network policies that each contain information such as user information, permissions (e.g., specific to a user, realm, application, geographical region, time, etc.), geographical information (e.g., country, region, city, town, building, etc.), temporal constraints, and network capabilities. In an embodiment, user information contains one or more user preferences such as location information, associated permissions, associated realm permissions, preferred networks, preferred network interfaces, preferred security protocols, and cost constraints. In an embodiment, network capabilities include information regarding preferred networks, preferred network interfaces, required security protocols, cost constraints, required throughput, acceptable error rates, security requirements, and priority considerations. In various embodiments, policies 124 contains a list of user activities, log files of the activities of a user, and authentication information. In some embodiments, user preferences are associated with one or more computing devices (e.g., computing device 110). In an example, user preferences may include authentication information (e.g., identifier, password, encryption keys, etc.) to communicate responses from computing device 110 to public network 102, private network 104, and/or server computer 120. In another embodiment, user preferences include weighting factors that are applied to various portions of information contained within policies 124. In one scenario, weighting factors may be biased by an environmental factor (e.g., building dimensions affecting wireless connectivity).

In an embodiment, policies 124 dictate network priority for a plurality of users and devices. In an embodiment, network priority dictates one or more network performance standards such as maximum throughput, allocated bandwidth, maximum data transmission capacity (e.g., max data cap (e.g., 30 gigabytes, etc.), response times (e.g., ping), allowed error rates, etc., for a user, realm, group, location, device, and application in relation to one or more other users. In an embodiment, program 150 triggers network priority actions when network congestion exceeds a threshold level. In this embodiment, the threshold level is determined by real-time or expected (e.g., predicted utilizing historical performance) network performance. For example, if total allocated bandwidth exceeds a threshold of 90% allotment then program 150 determines that there is a high level of network congestion. In another example, program 150 determines high level of network congestion if a network ping value exceeds 300 milliseconds. In various embodiments, program 150 prioritizes network traffic based on associate policies. In an embodiment, program 150 may suspend or delete one or more generated private networks based on network priority and network conditions. For example, users may belong to a set of groups such as VIP (e.g., always provide a network (e.g., eliminate lower priority user and associated networks to allocate sufficient networking performance for VIP)), above-average (e.g., provide network if congestion is low (e.g., below 25% bandwidth utilization), average (e.g., provide network if congestion is not high (e.g., between 25%-50% bandwidth utilization), and below-average (e.g., provide network if there is no congestion and if providing the network will not substantially impact any other user (e.g., bandwidth is sufficient for all users)).

In another embodiment, policies 124 creates, modifies, maintains, and stores a plurality of network templates. In an embodiment, network templates are created based on a plurality of characteristics and scopes including, but not limited to, user location, device, user profile (i.e., user preferences, parameters, requirements, scheduled events, etc.), application, and network. In one embodiment, network templates include configuration files, system and application settings/preferences, IP routing tables, firewall settings, and router configuration files and settings which dictate, manage, apply, force, constrain one or more devices and/or applications based on optimized and preferred networks, nodes, servers, and routing paths. In an embodiment, program 150 can adaptively modify existing network templates based on changes to one or more policies stored in policies 124. For example, if a user ceases utilizing or removes a user device then program 150 modifies and adjusts any network templates associated with said user, device, and application. In various embodiments, network templates are applied on a per device, application, and/or network interface basis utilizing one or more policies associated with a user. In various embodiments, users, automatically download and apply network templates to one or more applications, network interfaces, and devices. In an embodiment, program 150 pushes network templates to user devices.

Program 150 is a program for generating and managing personalized private roaming service set identifiers and networks. In various embodiments, program 150 may implement the following steps: generate one or more private networks based on one or more policies associated with a user and capabilities of one or more network providers in a communication proximity to the user; create one or more configuration files required to implement the one or more generated private networks on the one or more network providers; implement the one or more generated private networks by applying the one or more created configuration files to the one or more network providers. In the depicted embodiment, program 150 is a standalone software program. In another embodiment, the functionality of program 150, or any combination programs thereof, may be integrated into a single software program. In some embodiments, program 150 may be located on separate computing devices (not depicted) but can still communicate over public network 102 and private network 104. In various embodiments, client versions of program 150 resides on computing device 110 and/or any other computing device (not depicted) within distributed data processing environment 100. In a further embodiment, client versions of program contained with computing device 110 management one or more network connections associated with a user, realm, or an associated computing device. In the depicted embodiment, program 150 utilizes a RADIUS as a backend for wireless (e.g., 802.1X, private network 104) authentication. Program 150 is depicted and described in further detail with respect to FIG. 2.

The present invention may contain various accessible data sources, such as database 122, that may include personal storage devices, data, content, or information the user wishes not to be processed. Processing refers to any, automated or unautomated, operation or set of operations such as collection, recording, organization, structuring, storage, adaptation, alteration, retrieval, consultation, use, disclosure by transmission, dissemination, or otherwise making available, combination, restriction, erasure, or destruction performed on personal data. Program 150 provides informed consent, with notice of the collection of personal data, allowing the user to opt in or opt out of processing personal data (e.g., policies 124). Consent can take several forms. Opt-in consent can impose on the user to take an affirmative action before the personal data is processed. Alternatively, opt-out consent can impose on the user to take an affirmative action to prevent the processing of personal data before the data is processed. Program 150 enables the authorized and secure processing of user information, such as tracking information, as well as personal data, such as personally identifying information or sensitive personal information. Program 150 provides information regarding the personal data and the nature (e.g., type, scope, purpose, duration, etc.) of the processing. Program 150 provides the user with copies of stored personal data. Program 150 allows the correction or completion of incorrect or incomplete personal data. Program 150 allows the immediate deletion of personal data.

Figure 2:
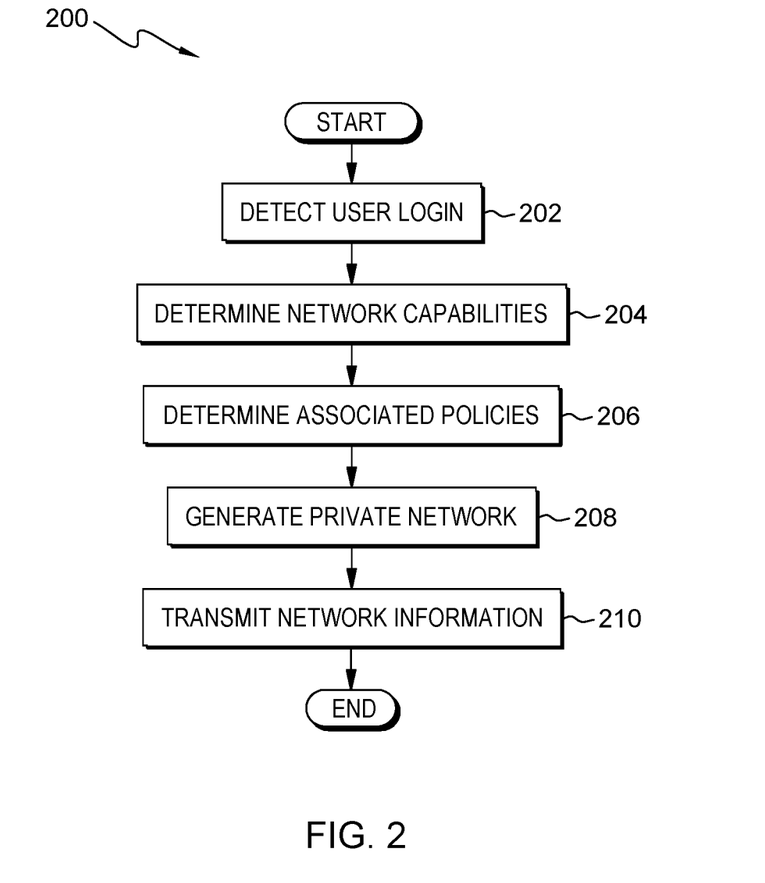
FIG. 2 is a flowchart depicting operational steps of a program, on a server computer within the data processing environment of FIG. 1, for generating and managing personalized private roaming service set identifiers and networks, in accordance with an embodiment of the present invention.

FIG. 2 is a flowchart depicting operational steps of program 150 for generating and managing personalized private roaming service set identifiers and networks, in accordance with an embodiment of the present invention.

Program 150 detects user login (step 202). In an embodiment, a user initiates a request (e.g., network request, authentication request, etc.) utilizing one or more computing devices (e.g., computing device 110). In another embodiment, program 150 monitors the operating system of computing device 110 for the initiation a network request (e.g., data transmission, hypertext transfer protocol requests/responses, etc.). In various embodiments, program 150 (e.g., client version of program 150) acts as an inline proxy and/or a transparent proxy 'sitting' in between a computing device (e.g., computing device 110) and a destination network (e.g., public network 102 and private network 104) and/or server (e.g., server computer 120). In this embodiment, all network traffic to and from the computing device will travel through program 150. In another embodiment, program 150 monitors application (e.g., not depicted) activity to determine a network request. In this embodiment, program 150 identifies a requesting application (e.g., application name, identifier, purpose, etc.) and pauses, delays, or halts the request until an appropriate (e.g., performance and security) network is generated and selected.

In an embodiment, program 150 receives user identifiers, credentials, location information, and/or realm status from one or more associated computing devices. In this embodiment, program 150 receives information regarding user preferences and constraints such as security requirements or application specific details (e.g., minimum ping, throughput, bandwidth, purpose, etc.). In an embodiment, program 150 may identify a user utilizing a media access control (MAC) address, a unique identifier (UUID), and/or information embedded in a computing device. In another embodiment, program 150 determines information related to an activity (e.g., application utilized, purpose of communication, etc.) based on requested network parameters (e.g., security requirements, performance requirements, etc.). In an embodiment, program 150 utilizes localization techniques for determining a device position with wireless access points based on measuring an intensity of a received signal (received signal strength).

Responsive to program 150 detecting a user login or network request, program 150 provides authentication, authorization, and accounting capabilities for the network request. In another embodiment, program 150 initiates an authentication protocol to obtain additional information that is included with identifying a user of computing device 110. In an embodiment, program 150 identifies a realm or group associated with the user. In example, a user provides a user id in the following format: userA@company1.com. In this example, program 150 recognizes the "@" as the start of a realm identifier, here userA is associated with the company1 realm, division, or group. In various embodiments, individual companies and vendors create specific extensions and procedures and export the extensions to an authentication system (e.g., RADIUS) utilizing vendor-specific attributes (VSA). VSA can be utilized to create or adjust one or more policies contained within policies 124. In another embodiment, program 150 may identify other electronic or computing devices that are within an area dictated by one or more user preferences or associated with the user (e.g., preregistered devices, etc.). Once a user and/or device is authenticated, program 150 retrieves one or more policies (e.g., policies 124) that are associated with the detected user (e.g., user permissions, realm permissions), requesting application, or computing device. For example, an authenticated user is provided access to a plurality of network attached shares as dictated by a retrieved policy associated with the user or with an associated group. If a user can not be identified, authenticated, or authorized, then program 150 requests additional identification and security information. In another example, program 150 terminates the request and prevents any future connection attempts.

Program 150 determines network capabilities (step 204). Program 150 identifies one or more available network providers (e.g., routers, access points, computing devices, switches, hubs, etc.) in a communication proximity (e.g., above a signal strength threshold (e.g., above −67 decibel milliwatts), operational distance, etc.) to a user or one or more associated computing devices. In one embodiment, program 150 identifies one or more wireless networks that are within a wireless communication range of computing device 110. In one scenario, program 150 utilizes a wireless communication program (not shown), such as a scanning program, to detect and identify network providers (e.g., wireless networks). For example, a wireless network is identified by a MAC address or a UUID. In an embodiment, program 150 identifies one or more network capabilities associated with one or more identified network providers. In this embodiment, program 150 queries the identified network providers to determine network capability information such as networking interfaces, operating bands, wireless standards, power method, maximum power consumption, maximum transmission power, number of supported independent SSIDs, wireless security, operating temperatures, operating humidity, virtual local area network (VLAN) capabilities, guest traffic isolation support, number of concurrent users, quality of service (QOS) capabilities, and associated certifications. In some embodiments, program 150 may utilize one or more authentication protocols in order to obtain specifications and/or capabilities of the identified wireless networks.

In various embodiments, program 150 utilizes computing device 110 to determine a location for each of the one or more identified network providers (e.g., wireless networks) utilizing a wireless-based positioning system (WPS). In an embodiment, program 150 utilizes an indoor positioning system (IPS) to locate objects (e.g., associated computing devices) or people (e.g., an user) inside a building using radio waves, magnetic fields, acoustic signals, or other sensory information, collected by computing device 110. In an embodiment, program 150 eliminates network providers (e.g., routers, access points, repeaters, hubs, computing devices (e.g., laptops, phones, etc.), etc.) that are unable to provide capabilities required by the user, realm, application, or device. In this embodiment, program 150 creates a list of compatible network providers, suitable for the needs (e.g., intersection of wireless capabilities and policy requirements) of a connecting/requesting user, device, or application.

Program 150 determines associated policies (step 206). Program 150 determines one or more policies (e.g., policies 124) that are controlling or associated with a given user (e.g., user preferences), realm (e.g., company preferences), application, device, geographical region, etc. For example, if a user is attempting to access confidential information located on a private server utilizing a public network, then program 150 retrieves an associated policy that requires all data to be transmitted over a virtual private network (VPN) or an equivalent encrypted network (e.g., IPSEC, etc.). In this example, program 150 prevents the user from accessing said information from any network that is not generated by program 150. Further in this example, program 150 will subsequently generate a private network that presents one or more unadvertised, isolated, and encrypted private networks for the user, while implementing network parameters and preferences that force, a policy dictated, VPN connection from one or more network providers to one or more destination servers and services.

Responsive to program 150 determining one or more controlling policies, program 150 creates or retrieves (e.g., historical network template) a network template based on the determined network capabilities and policies. In one embodiment, network templates include all required protocols (e.g., security, transport, etc.), networks, service providers, and network interfaces for a specified device, user, or application as dictated by one or more associated policies. In another embodiment, network templates include one or more aggregated or packet splitting network interfaces, and associated service providers and networks. In a further embodiment, network templates detail the required network paths, routes, and intermediate servers and nodes, all inbound/outbound packets must conform to. In an embodiment, program 150 stores said created network template into policies 124 and associates the network template to relevant policies contained within. For example, if program 150 creates a new network template, specific to a device, then program 150 stores and applies said network template to any available associated device, applications, and network interfaces. In various embodiments, program 150 retrieves a related, similar, or historical network template and modifies said template to conform with the determined network parameters and settings.

Program 150 generate private network (step 208). Program 150 generates one or more private networks utilizing the determined policies and the determined wireless capabilities, as described in step 206. Program 150 utilizes one or more determined policies to create one or more instructions (e.g., network parameters) utilized to generate a conforming private network. In an embodiment, program 150 dictates which users, devices, and applications are allowed on the generated network. In a further embodiment, program 150 dictates allowed protocols, security parameters, and wireless standards for a generated network. For example, program 150 generates a private (e.g., encrypted, password protected, isolated, and unadvertised (e.g., hidden SSID)) wireless network specifically for a user or group in a geographical limited area for an express purpose or application (e.g., email, accessing confidential information, transmitting sensitive data, connecting to a work intranet, etc.). In an embodiment, program 150 continuously generates one or more private networks indefinitely or until a user logs off or ceases utilizing one or more permitted devices, a user leaves a geographical region (e.g., building, office, town, city, state, country, etc.), subject to one or more restrictions dictated by one or more policies (e.g., temporal restrictions, data caps, etc.), or by action of an administrator. In another embodiment, program 150 generates one or more private networks continuously, on-demand (e.g., requested by a user or application) and/or congestion threshold, etc. For example, program 150 detects a user attempting to access a confidential datastore on an unencrypted public network. In this example, program 150 suspends the network request until an associated policy is determined and utilized to generate and implement a private network within a sufficient signal distance (e.g., above a signal strength threshold) of the user and associated computing devices. As described below, program 150 facilitates a connection between one or more associated computing devices and the generated private network.

In an embodiment, program 150 creates one or more configuration files containing network parameters derived from one or more determined policies. In this embodiment, program 150 conforms the network parameters based on determined wireless capabilities, as long as minimal requirements are maintained. In a further embodiment, program 150 utilizes the created configuration files to apply generated private networks to one or more network devices. For example, responsive to generating a private network, program 150 creates one or more configuration files containing network settings and parameters necessary to effectuate one or more requirements dictated by one or more determined policies. In another embodiment, program 150 negotiates with one or more identified network providers providing capable and available network providers one or more settings, parameters, or files necessary to implement one or more generated private networks. In various embodiments, program 150 utilizes one or more application programming interfaces (APIs) accessible on one or more identified network providers to create, remove, and manage one or more generated private networks. In another embodiment, program 150 establishes client versions allowing program 150 to create and manage one or more generated private networks.

In an embodiment, program 150 limits generated SSIDs to one or more specific MAC addresses (e.g., associated devices). In another embodiment, program 150 temporal limits a generated private network, for example, program 150 establishes a SSID lifetime. In this embodiment, program 150 utilizes SSID lifetime to reduce the risk of wireless enabled devices from being compromised while simultaneously reducing strain on other networks. In an embodiment, program 150 deploys (e.g., implements) the generated private network utilizing one or more network providers identified above. For example, program 150 deploys the generated private network utilizing a series of routers available within a threshold proximity of the user and/or one or more computing devices associated with the user. In an embodiment, program 150 implements one or more generated private networks utilizing one or more generated configuration files as described above. In various embodiments, program 150 utilizes QoS and traffic shaping techniques to prioritize and filter network traffic. For example, program 150 provides a generated private network that, automatically, prioritizes all voice communication and associated data. In another example, program 150 utilizes QoS to limit web browsing traffic. In various embodiments, program 150 utilizes QoS and traffic shaping to prioritize one or more users utilizing a same network or network resources.

Program 150 transmit network information (step 210). Responsive to determining and generating a private network based on user, realm, and network preferences, program 150 transmit one or more sets of connection information (e.g., SSID, authentication details (e.g., required keys or passwords), etc.) to a user. In an embodiment, program 150 applies a generated network templates, containing all required information and details, to one or more computing devices associated with a user in a particular network, location, or geographical region. In one embodiment, program 150 manages, maintains, and enforces the applied network template. In another embodiment, program 150 continuously monitors and modifies an applied network template based on the current parameters and status of a device, user, application, network interface, service provider, and associated network. In this embodiment, program 150 retrieves policies controlling network, performance, security, hardware parameters based on user permissions, authentication, authorization, and location. In an additional embodiment, program 150 controls all network traffic associated with a device and user based on one or more policies. In an embodiment, program 150 applies the network template on an application basis, where only permitted application network traffic, as specified by a policy and/or network template, will be transmitted on the generated private network. In another embodiment, all other traffic is discarded, stored to be transmitted at a later time, or transmitted utilizing other available networks (e.g., public network 102).

In some embodiments, program 150 may transmit a notification to a user or associated computing device using a plurality of transmission methods including, but not limited to, short message service (SMS), email, push notification, automated phone call, text-to-speech, etc. For example, program 150 sends a user information necessary for the user to connect to a generated network. In another embodiment, program 150 may utilize text-to-speech methods to provide auditory instructions. In other embodiments, program 150 may utilize a plurality of factors when determining the method of transmission. In an embodiment, the notifications include, but are not limited to, user identification, network identification, expected wireless strength, temporal limitations, connectivity restrictions, etc. In another embodiment, the notifications may include further action options such as cancelling a request, request another network, and providing feedback. In this embodiment, program 150 transmits notification to all affected users, for example, all users in a realm or company. In various embodiments, the user authorizes program 150 to automatically initiate, cancel, and recreate private networks.

In an example scenario, userA connects to a public wireless network located in a busy store. A foreign RADIUS associated with the public wireless network identifies one or more capabilities associated with one or more available wireless networks. Program 150 identifies the user and transmits (e.g., provides) user and authentication information to a home RADIUS (e.g., server computer 120) associated with or maintained by a realm associated with userA.

Program 150 adds private SSID VSA specific to the network and location associated with userA. Program 150 (e.g., RADIUS module) processes the authentication request, retrieves appropriate policies governing the situation (e.g., user type, realm type, application category, location, network congestion, priority, etc.). Program 150 creates and generates one or more network templates dictating prescribed network parameters and generates an associated private network. Program 150 may directly create said network or it may communicate with the foreign RADIUS/ public network, to implement the generated network according to determined specifications. Responsive to generating the private network (e.g., private network 104), program 150 transmits network parameters (e.g., SSID, authentication information) to userA. Program 150 may apply the created network template to one or more computing devices associated with userA, conforming the one or more computing devices to a network configuration required to connect and interact with one or more generated and implemented private networks.

In a continuing example, as userA travels within a permitted geographical region, program 150 dynamically monitors one or more computing devices associated with the user and one or more identified network providers. UserA initially connects to a generated private network implemented by a near network provider (i.e., the active network provider). UserA continues to travel away from the active network provider, substantially reducing effective communication through signal strength deterioration. Responsive to program 150 determining the network strength (e.g., signal strength, availability, jitter, retransmission rate, error rates, ping, etc.) of the active network provider does not exceed (e.g., meet) a network strength threshold (e.g., a weighted representation of network strength), program 150 removes, suspends, or migrates the associated (e.g., implemented, negotiated, and/or applied) private network. In another embodiment, responsive to determining a signal strength of the active network provider is out of a permissible range of signal strength, program 150 identifies a subsequent network provider with a network strength greater (e.g., a larger number of decibels in relation to a milliwatt) than the active network provider. In another embodiment, responsive to determining a network strength of a subsequent network provider exceeds the network strength threshold or is greater than the current or active network provider, program 150 creates or migrates an existing private network to one or more subsequent network providers (e.g., wireless networks that have sufficient signal strength).

Figure 3:
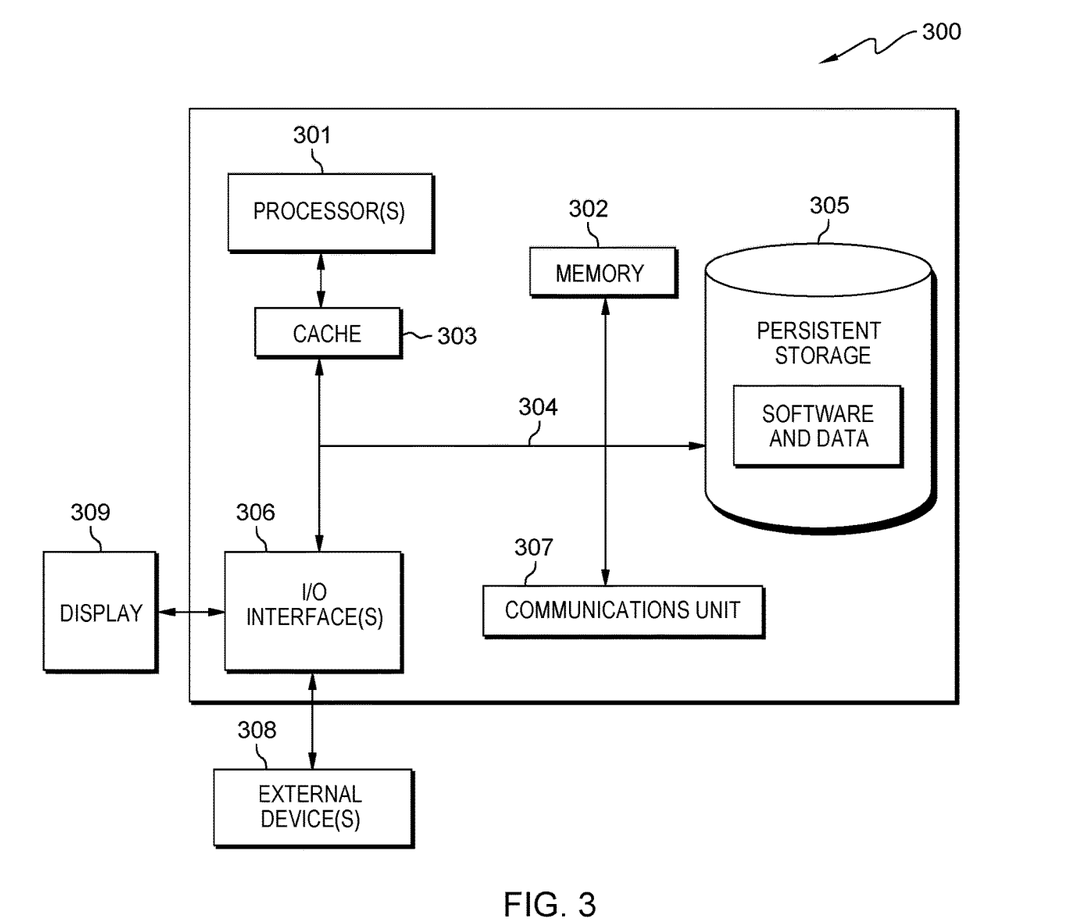
FIG. 3 is a block diagram of components of a computing device and a server computer, in accordance with an embodiment of the present invention.

FIG. 3 depicts a block diagram of components of computing device 110 and server computer 120 in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

Computing device 110 and server computer 120 includes communications fabric 304, which provides communications between cache 303, memory 302, persistent storage 305, communications unit 307, and input/output (I/O) interface(s) 306. Communications fabric 304 can be implemented with any architecture designed for passing data and/or control information between processors (such as microprocessors, communications, and network processors, etc.), system memory, peripheral devices, and any other hardware components within a system. For example, communications fabric 304 can be implemented with one or more buses or a crossbar switch.

Memory 302 and persistent storage 305 are computer readable storage media. In this embodiment, memory 302 includes random access memory (RAM). In general, memory 302 can include any suitable volatile or non-volatile computer readable storage media. Cache 303 is a fast memory that enhances the performance of computer processor(s) 301 by holding recently accessed data, and data near accessed data, from memory 302.

Program 150 may be stored in persistent storage 305 and in memory 302 for execution by one or more of the respective computer processor(s) 301 via cache 303. In an embodiment, persistent storage 305 includes a magnetic hard disk drive. Alternatively, or in addition to a magnetic hard disk drive, persistent storage 305 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 305 may also be removable. For example, a removable hard drive may be used for persistent storage 305. Other examples include optical and magnetic disks, thumb drives, and smart cards that are inserted into a drive for transfer onto another computer readable storage medium that is also part of persistent storage 305.

Communications unit 307, in these examples, provides for communications with other data processing systems or devices. In these examples, communications unit 307 includes one or more network interface cards. Communications unit 307 may provide communications through the use of either or both physical and wireless communications links. Program 150 may be downloaded to persistent storage 305 through communications unit 307.

I/O interface(s) 306 allows for input and output of data with other devices that may be connected, respectively, to computing device 110 and server computer 120. For example, I/O interface(s) 306 may provide a connection to external device(s) 308, such as a keyboard, a keypad, a touch screen, and/or some other suitable input device. External devices 308 can also include portable computer readable storage media such as, for example, thumb drives, portable optical or magnetic disks, and memory cards. Software and data used to practice embodiments of the present invention, e.g., program 150, can be stored on such portable computer readable storage media and can be loaded onto persistent storage 305 via I/O interface(s) 306. I/O interface(s) 306 also connect to a display 309.

Display 309 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, conventional procedural programming languages, such as the "C" programming language or similar programming languages, and quantum programming languages such as the "Q" programming language, Q#, quantum computation language (QCL) or similar programming languages, low-level programming languages, such as the assembly language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
responsive to a network request on a public network, identifying, by one or more computer processors, a realm associated with a network request initiated from an application and an associated user, wherein the realm has exported extensions to an authentication system utilizing vendor-specific attributes (VAS), wherein the network request is an attempt to access a private server on the public network;
identifying, by one or more computer processors, one or more network providers and associated network capabilities in a communication proximity to the application and the associated user;
generating, by one or more computer processors, one or more private networks based on one or more policies associated with the identified realm and the network capabilities of the identified one or more network provider, wherein the one or more private networks are unadvertised, isolated, and encrypted;
eliminating, by one or more computer processors, at least one of the one or more network providers that are unable to provide the respective network capabilities required by the identified realm;
creating, by one or more computer processors, one or more configuration files required to implement the one or more generated private networks on the one or more network providers; and
implementing, by one or more computer processors, the one or more generated private networks by applying the one or more created configuration files to the one or more network providers.

2. The method of claim 1, wherein the policies include a network priority dictating one or more network performance standards that include network throughput, allocated bandwidth, data transmission capacity, and data prioritization in relation to one or more users, realms, applications, and devices.

3. The method of claim 1, wherein the capabilities include operating bands, wireless standards, power consumption, transmission power, number of supported independent service set identifiers, security, operating temperatures, operating humidity, virtual local area network support, guest traffic isolation support, number of concurrent users, and quality of service capabilities.

4. The method of claim 1, further comprising:
detecting, by one or more computer processors, the user and one or more associated devices initiating a network request in a roaming environment.

5. The method of claim 4, further comprising:
creating, by one or more computer processors, a network template wherein the network template constrains the network request to one or more of the implemented private networks.

6. The method of claim 5, further comprising:
applying, by one or more computer processors, the network template to the one or more devices associated with the network request.

7. The method of claim 1, further comprising:
responsive to an active network provider not meeting a signal strength threshold, identifying, by one or more computer processors, one or more subsequent network providers with a greater signal strength than the active network provider.

8. The method of claim 7, further comprising:
removing, by one or more computer processors, the one or more private networks implemented on the active network provider.

9. The method of claim 7, further comprising:
migrating, by one or more computer processors, the one or more private networks implemented on the active network provider to the one or more identified subsequent network providers.

10. The method of claim 1, wherein generating one or more private networks based on one or more policies associated with a user and capabilities of one or more network providers in a communication proximity to the user, comprises:
generating, by one or more computer processors, one or more private networks on-demand by one or more applications associated with the user.

11. The method of claim 3, further comprising:
authenticating, by one or more computer processors, the detected user utilizing a remote authentication dial-in user service (RADIUS).

12. The method of claim 11, further comprising:
providing, by one or more computer processors, one or more vendor-specific attributes to the RADIUS.

13. The method of claim 1, wherein the one or more policies dictate preferred networks, preferred network interfaces, security requirements, cost constraints, permissible network performance, and acceptable error rates.

14. A computer program product comprising:
one or more computer readable storage media and program instructions stored on the one or more computer readable storage media, the stored program instructions comprising:
program instructions to responsive to a network request on a public network, identify a realm associated with a network request initiated from an application and an associated user, wherein the realm has exported extensions to an authentication system utilizing vendor-specific attributes (VAS), wherein the network request is an attempt to access a private server on the public network;
program instructions to identify one or more network providers and associated network capabilities in a communication proximity to the application and the associated user;
program instructions to generate one or more private networks based on one or more policies associated with the identified realm and the network capabilities of the identified one or more network providers, wherein the one or more private networks are unadvertised, isolated, and encrypted;
program instructions to eliminate at least one of the one or more network providers that are unable to provide the respective network capabilities required by the identified realm;
program instructions to create one or more configuration files required to implement the one or more generated private networks on the one or more network providers; and
program instructions to implement the one or more generated private networks by applying the one or more created configuration files to the one or more network providers.

15. The computer program product of claim 14, wherein the program instructions, stored on the one or more computer readable storage media, further comprise:

program instructions to detect the user and one or more associated devices initiating a network request in a roaming environment.

16. The computer program product of claim 15, wherein the program instructions, stored on the one or more computer readable storage media, further comprise:
program instructions to create a network template wherein the network template constrains the network request to one or more implemented private networks.

17. The computer program product of claim 16, wherein the program instructions, stored on the one or more computer readable storage media, further comprise:
program instructions to apply the network template to the one or more devices associated with the network request.

18. A computer system comprising:
one or more computer processors;
one or more computer readable storage media; and
program instructions stored on the computer readable storage media for execution by at least one of the one or more processors, the stored program instructions comprising:
program instructions to responsive to a network request on a public network, identify a realm associated with a network request initiated from an application and an associated user, wherein the realm has exported extensions to an authentication system utilizing vendor-specific attributes (VAS), wherein the network request is an attempt to access a private server on the public network;
program instructions to identify one or more network providers and associated network capabilities in a communication proximity to the application and the associated user;
program instructions to generate one or more private networks based on one or more policies associated with the identified realm and the network capabilities of the identified one or more network providers, wherein the one or more private networks are unadvertised, isolated, and encrypted;
program instructions to eliminate at least one of the one or more network providers that are unable to provide the respective network capabilities required by the identified realm;
program instructions to create one or more configuration files required to implement the one or more generated private networks on the one or more network providers; and
program instructions to implement the one or more generated private networks by applying the one or more created configuration files to the one or more network providers.

19. The computer system of claim 18, wherein the program instructions, stored on the one or more computer readable storage media, further comprise:
program instructions to detect the user and one or more associated devices initiating a network request in a roaming environment.

20. The computer system of claim 19, wherein the program instructions, stored on the one or more computer readable storage media, further comprise:
program instructions to create a network template wherein the network template constrains the network request to one or more implemented private networks.

* * * * *